United States Patent [19]

Kim et al.

[11] Patent Number: 4,591,580
[45] Date of Patent: May 27, 1986

[54] STABILIZED AND DOUBLY PROMOTED PLATINUM GROUP METAL CATALYSTS FOR EMISSION CONTROL AND METHOD OF MAKING SAME

[75] Inventors: Gwan Kim, Olney; Michael V. Ernest, Catonsville, both of Md.

[73] Assignee: W. R. Grace & Co., New York, N.Y.

[21] Appl. No.: 629,309

[22] Filed: Jul. 10, 1984

Related U.S. Application Data

[63] Continuation-in-part of Ser. No. 461,119, Jan. 26, 1983, Pat. No. 4,476,246.

[51] Int. Cl.$^4$ .................. B01J 21/04; B01J 23/10; B01J 23/58
[52] U.S. Cl. ................................ 502/303; 502/304; 423/213.5
[58] Field of Search ..................... 502/303, 304; 423/213.5

[56] References Cited

U.S. PATENT DOCUMENTS

| | | | |
|---|---|---|---|
| 3,776,859 | 12/1973 | Simpson | 252/462 |
| 4,128,503 | 12/1978 | Yamauchi et al. | 423/213.5 X |
| 4,128,506 | 12/1978 | Hegedus et al. | 252/466 PT |
| 4,152,301 | 5/1979 | Summers et al. | 252/466 PT |
| 4,170,573 | 10/1979 | Ernest et al. | 252/462 |
| 4,283,308 | 8/1981 | O'Hara et al. | 252/435 |
| 4,384,891 | 5/1983 | Barnabé | 75/123 K |
| 4,369,132 | 1/1983 | Kinoshita et al. | 252/466 PT |
| 4,405,506 | 9/1983 | Kim | 252/462 |
| 4,407,738 | 10/1983 | Eskinazi et al. | 502/334 |

FOREIGN PATENT DOCUMENTS 53-19986  2/1978  Japan ................... 502/303

OTHER PUBLICATIONS

Schaper et al., "The Influence of Lanthanum Oxide on the Thermal Stability of Gamma Alumina Catalyst Supports", Applied Catalysis, 7 (1983), pp. 211-220.
Schaper et al., "The Influence of High Partial Steam Pressures on the Sintering of Lanthanum Oxide Doped Gamma Alumina", Applied Catalysis, 9 (1984), pp. 129-132.

*Primary Examiner*—W. J. Shine
*Attorney, Agent, or Firm*—Edward J. Cabic

[57] ABSTRACT

Alumina supported platinum-group metal catalysts exhibit exceptionally good performance and durability when the support is sequentially modified to include support stabilization by lanthana or lanthana-rich rare earth oxides, double promotion by ceria and alkali metal oxides, especially ceria along with lithia, and optionally nickel (oxide) as a base metal catalytic ingredient. For a pelleted Rh containing catalyst to exhibit such an outstanding performance at least part of the Rh component is added separately from any other Pt group metals.

22 Claims, No Drawings

STABILIZED AND DOUBLY PROMOTED PLATINUM GROUP METAL CATALYSTS FOR EMISSION CONTROL AND METHOD OF MAKING SAME

CROSS-REFERENCE TO PATENT APPLICATION

This application is a continuation-in-part of our co-pending U.S. application Ser. No. 461,119, filed Jan. 26, 1983, now U.S. Pat. No. 4,476,246.

BACKGROUND OF THE INVENTION

This invention relates to a catalyst for use in auto emission control which has improved hydrothermal stability as well as improved poison resistance and especially for an improved three-way catalyst (TWC).

As we described in our copending application U.S. Ser. No. 461,119, filed Jan. 26, 1983, now U.S. Pat. No. 4,476,246, performance of alumina-supported Pt-Rh or Pt-Pd-Rh TWC could be substantially improved by doubly promoting the catalyst with ceria and the oxides of alkali metals, especially of Li. The improvement in TWC performance is manifested in both high conversion efficiency as well as in good durability which is far superior to the singly promoted TWCs with ceria. Upon repeated exposures to severely hydrothermal conditions, however, sintering takes place along with interaction of the catalytic materials either among themselves or with exhaust contaminants. In addition, the support undergoes a phase transition to the undesired alpha-alumina form and as a cumulative result there is a decrease in TWC performance.

OBJECTS OF THE INVENTION

It is an object of this invention to obtain a hydrothermally stable doubly promoted catalyst and especially a TWC.

It is a further object of this invention to obtain a catalyst utilizing a transitional alumina support which forms a minimum amount of alpha-alumina upon hydrothermal treatment and especially a TWC.

It is a further object of this invention to provide an improved method for incorporating catalytic ingredients especially noble metals so as to resist deactivation due to poisoning.

It is a further object to improve the hydrothermal stability of a catalyst and especially a TWC without sacrificing catalytic performance as reflected in conversion efficiencies after aging by utilizing metal impregnation procedures which will ensure high catalytic performance.

It is a further object to obtain a long-durability pelleted catalyst and especially a TWC by optimizing the metals concentrations to a lower level at or near the exterior surface of the pellet while limiting the overall metals penetration to a desired depth.

It is a further object to improve the hydrocarbon efficiency of the catalyst by adding nickel to the catalyst.

These and further objects will become apparent as the description of the invention proceeds.

SUMMARY OF INVENTION

The extent of alpha-alumina formation can be greatly reduced by stabilizing a transitional alumina support with lanthana or La-rich rare earth oxides while still maintaining high catalytic performance.

The stabilized and doubly promoted Pt-group metal catalysts comprises four material components which are (1) support or carrier, (2) stabilizer, (3) promoters, and (4) catalytic metals.

The preferred support or carrier is a transitional alumina particle having a BET ($N_2$) surface area in the range from at least 20 to 200 $m^2/g$, preferably from 70 to 150 $m^2/g$. The alumina support particle can be either a washcoat powder or a larger, formed pellet or particle. Lanthana or La-rich rare earth oxides comprise the stabilizer. When lanthana alone, without accompanying rare earth oxides, is employed as a stabilizer the desired level is from at least 0.5 to 10 wt. % $La_2O_3$. When La-rich rare earth (i.e., Ce-depleted rare earth mixture) oxide is used as a stabilizer, the $La_2O_3$ is at least 50% by weight of the total rare earth oxides and the desired level is from at least 1 to 10 wt. % $La_2O_3$. By Ce-depleted, we mean that the $CeO_2$ content when calcined will be no more than 15% and more preferably no more than 10% by weight. The preferred level of stabilizer, regardless of the source, is from 2 to 6 wt. % $La_2O_3$. This additive essentially stabilizes the transitional alumina support against hydrothermal severities, and hence it will stabilize the promoters as well as the catalytic metals which are subsequently dispersed on the lanthana stabilized support.

It is not the intention of this invention to use lanthana in the form of mixed, unseparated rare earth oxides in naturally occurring ratios. In monazite, for example, $La_2O_3$ is only 19.5 wt. % of the rare earth oxides. This level of lanthana is too low. Although one might expect that larger amounts of the naturally occurring rare-earth oxide could be used to obtain the desired level of lanthana, this higher mixed oxide loading would begin to block the alumina pores and have other adverse catalytic effects—lower pore volume and higher density. Thus a lanthana enriched form of mixed rare earth oxides is desired with the lanthana being at least 50% by weight. This stabilization is an important feature of the invention and is applicable to all types of alumina —supported automotive emission control catalysts, oxidative, three-way, monolithic or pelleted.

Both ceria and alkali metal oxides are present as the promoter with from at least 1 to 20 wt. % $CeO_2$, preferably from 2 to 10 wt. % $CeO_2$, and from at least 0.5 to 5 wt. %, preferably from 1 to 3 wt. % alkali metal oxides, especially $Li_2O$.

It is a further feature of this invention to deposit the catalytic metals in the form of Pt-Rh, Pt-Pd-Rh, Pd-Rh, or Pt-Pd with special metal concentration profiles which especially make the pelleted catalysts of this invention have unique and excellent performance and which exhibit much longer than the usual 50,000-mile durability. The catalytic metals with their unique metals concentration profile can be applied to any support whether or not it is lanthana stabilized as is the preferred embodiment of this invention. This unique metals concentration profiles has at least three distinguishing characteristics. First, unlike the "layered" catalyst described in U.S. Pat. Nos. 4,128,506 (Hegedus et al) and 4,152,301 (Summers et al), both the major (e.g. Pt) and minor (e.g. Rh) component metals exhibit higher concentrations at or near the exterior surface than in the interior. Second, the concentration of each of the major and minor component metals, especially of the major, at or near the exterior surface represents a substantially lower fraction of each metal loaded than those disclosed in U.S. Pat. No. 4,405,506 (Kim). Because the metals located at or near the exterior surface of the catalyst are bound to be poisoned, this reduces the amounts of both the major and minor component metals that will be wasted. Third, the overall penetration depth of each metal is controlled so as not to exceed approximately 300 microns (based on the $SnCl_2$ staining method). Catalysts with such metals concentration profiles can be prepared by following the special impregnation and drying procedures described below as well as in Examples 5, 6, 8, 9 and 10.

The metals concentration profile determined by the layer abrasion test described in U.S. Pat. No. 4,152,301 has a maximum platinum concentration within about 50 microns of the exterior surface of the support and no more than about 70% of the total platinum loaded is located within about 100 microns depth. For rhodium, the maximum concentration is within about 50 microns of the exterior surface of the support and no more than about 95% of the total rhodium loaded is located within about 100 microns depth.

In another embodiment, Ni may be added from 0.5 to 20 wt. % NiO and preferably from 1 to 10 wt. % NiO to improve the catalyst efficiency for hydrocarbon conversion and especially as a TWC.

DETAILED DESCRIPTION OF THE INVENTION

The catalysts and especially the TWC compositions according to the present invention can be prepared in the following manner. Alumina pellets (or particles) are precalcined at 300°–1000° C., prefereably at 400°–600° C. to a total volatiles content of from 2 to 8 wt. %, preferably from 4 to 6 wt. %. Alumina pellets are then impregnated with an aqueous solution bearing $La^{3+}$ ions, preferably in the form of La-nitrate or hydrous La-oxide, dried at 100°–150° C., and air calcined at temperatures of about at least 800° C. and more preferably at about 1000°–1100° C.

The resulting lanthana-stabilized alumina pellets are impregnated with an aqueous solution containing both $Ce^{3+}$ and $M^+$ ions (where M is an alkali metal, especially Li), preferably in the form of nitrates, dried at 100°–150° C., and air calcined at 500°–1100° C., preferably at 700°–1010° C. Optionally, Ni from Ni-nitrate can be added along with these promoters, with some moderation in calcination temperature so that it does not exceed 900° C.

The stabilized and doubly promoted support thus obtained are impregnated in a single or multiple steps with solutions bearing sulfito complexes of noble metals. In the preferred embodiment the solutions are multiply impregnated. An especially preferred procedure is one in which the Rh-containing solution, preferably an acid sulfito complex solution of Rh, has at least some portion separately impregnated along with a penetration aid such as dibasic ammonium citrate either in the first or in the last impregnation step. After each impregnation the pellets are allowed to stand at room temperature for up to six hours, more preferably from ½ to 4 hours before drying at 100°–150° C. Finally, the catalyst is activated at 250°–550° C. and preferably in flowing $N_2$ containing 3–5 vol. % $H_2$. It is also possible that the alkali metal ingredient can be incorporated along with noble metals other than Rh. Furthermore, optionally, Ni can also be incorporated along with noble metals other than Rh.

When making alumina particle catalysts the amount of $CeO_2$ promoter applied is preferably between 1 and 20 wt. % and more preferably between 2–10 wt. %. This $CeO_2$ promoter is to be preferably added in a separate impregnation step from the lanthana stabilization step. In other words, when doing the initial lanthana stabilization step one can not use a naturally occurring mixed rare earth oxide and expect that the $CeO_2$ contained in the mixed rare earth oxide will provide the desired level of $CeO_2$ promotion. Instead, it is preferred to add the $CeO_2$ in a later impregnation step. The amount of alkali metal promoter applied expressed as the weight percent of the oxide $M_2O$, may be any effective amount up to about 5 wt. % and more preferably from about 0.5 to 3 wt. %.

The platinum group metal component may be platinum, palladium, rhodium, ruthenium, iridium, osmium, and mixtures thereof, with the preferred metals being Pt, Pd, Rh either alone or in any combination. When the platinum group metal contains more than one of such components, the component may be composed of a major amount of platinum or palladium and a minor amount of one or more of the other platinum group metals such as rhodium. When platinum and palladium are used alone, they can be in any ratio. The catalytic metals mixture may comprise from 0 to about 20 wt. % rhodium, or mixtures thereof and preferably about 10 wt. % rhodium and about 90 wt. % platinum, palladium, or mixtures thereof.

Various compounds, complexes, or fine metal dispersions of any of the platinum group metals in an aqueous or an organic medium may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

In a preferred embodiment of this invention, the impregnation solution contains sulfito complexes of platinum group metals. For platinum and palladium, either an acid or an ammonium sulfito complex can be used. The most preferred platinum source is the ammonium sulfito complex prepared according to the methods described in U.S. Pat. No. 3,932,309 (Graham et al). The use of these complexes provides excellent dispersion and control of penetration depth of the platinum group metal. Preferably, rhodium is incorporated in the catalyst by impregnation with an acid rhodium sulfito complex prepared by reacting rhodium trichloride or rhodium hydrous oxide with sulfurous acid.

In a preferred embodiment of this invention the pellets are held preferably for about two hours at room temperature after each impregnation is completed with the metal or metals. The composition may then be dried, for example, at a temperature of from about 100° C. to about 150° C. for about 2 to about 20 hours. The salt composition may be decomposed and the catalyst activated under conditions which provide a composition having characteristics that promote the desired reaction. The temperature of this activation is low enough to permit neither noble metal sintering nor sintering of the support. It is preferably done in a reducing atmosphere, e.g., by about a 1 hour reduction in flowing nitrogen containing 5 volume percent hydrogen at about 250°–550° C. and more preferably at about 400° C.

In the catalyst of this invention, the platinum group metals provide the catalytically active surfaces for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.1 to 6 percent based on the weight of the calcined composite to maintain good activity with prolonged use.

The La stabilized catalyst, which is especially suitable for use as a three-way catalyst for auto emission, is preferably made by impregnating an alumina support which has been heated to at least 300° C. with a solution containing a lanthanum salt. This salt is either in the form of just a lanthanum salt only or in the form of lanthanum-rich rare earth salts which upon calcination give rare earth oxides where $La_2O_3$ is at least 50% by weight of the total rare earth oxides.

The impregnated support is heated to at least decompose the lanthanum salt so as to obtain a lanthana impregnated support. In a preferred embodiment the heating is done at a temperature of from about 800° to 1100° C. to thermally stabilize the support. Next, promoters and one or more platinum group metals are applied by either one of two procedures. In the first procedure the lanthana-impregnated alumina support is impregnated with a soluble cerium salt solution. The impregnated support is heated to at least decompose the cerium salt so as to obtain a lanthana-ceria impregnated support. Then the lanthana-ceria impregnated support is impregnated with solutions bearing one or more platinum group metals and at least one alkali metal.

In the second procedure the lanthana impregnated support is impregnated with a solution containing a soluble cerium salt and a lithium salt. The impregnated support is heated to at least decompose the cerium and lithium salts to obtain a lanthana-ceria-lithia impregnated support. Then the lanthana-ceria-lithia impregnated support is impregnated with solutions bearing one or more platinum group metals to form a catalyst.

When the catalyst is being formed by either of these two methods, it is air dried at an ambient temperature for 0–4 hours and then at about 100°–150° C. so as to dry the catalyst after each impregnation with the solutions bearing the catalytic metals. During one of the earlier heating steps the catalyst is heated to a temperature of at least 800°–1100° C. and finally it is activated at a temperature of about 250°–550° C. with the preferred activation being done in the presence of hydrogen.

The preferred methods for providing platinum group metals have been discussed above. When making a catalyst which contains Rh, it is especially preferred to impregnate at least part of the Rh containing solution separately from the other platinum group metal solutions and to add a penetration aid to the Rh containing solution. Nickel can be further added in an amount of 0.5 to 20 wt. % NiO and especially in an amount of 1–10% NiO.

When the solutions of cerium salt and lithium salt are applied in the second procedure they can be added either (a) by first a cerium salt followed by a lithium salt, (b) by first a lithium salt followed by cerium salt or (c) by a simultaneous application of a mixture of the cerium salt and the lithium salt.

In the other embodiment according to the present invention, catalysts with long term durability can be made which do not require the same degree of hydrothermal stability provided by the lanthana stabilization. In this method the catalyst, which is suitable for use as a three-way catalyst for auto emission, is preferably made by applying promoters and at least two platinum group metals by one of two procedures. In the first procedure an alumina support which has been heated to at least 300° C. is impregnated with a soluble cerium salt solution. The impregnated support is heated to at least decompose the cerium salt to obtain a ceria impregnated support. Then the ceria impregnated support is impreganted with solutions bearing one or more platinum group metals and at least one alkali metal, and further including a Rh containing solution which has at least part of the Rh solution impregnated separately from the other platinum group metal solutions and alkali metal-bearing solutions.

In the second procedure the alumina support which has been heated to at least 300° C. is impregnated with a solution containing a cerium salt and a lithium salt. The impregnated support is heated to at least decompose the cerium and lithium salts to obtain a ceria-lithia impregnated support. Then the ceria-lithia impregnated support is impregnated with solutions bearing one or more platinum group metals including Rh and where at least part of the Rh containing solution is impregnated separately from the other platinum group metal solutions to form a catalyst.

When the catalyst is being formed by either of these two methods, it is air dried at an ambient temperature for 0–4 hours and then at about 100°–150° C. so as to dry the catalyst after each impregnation with the solutions bearing catalytic metals. During one of the heating steps the catalyst is heated to a temperature of at least 800°–1100° C. and finally it is activated at a temperature of about 250°–550° C. with the preferred activation being done in the presence of hydrogen. The preferred methods for providing platinum group metals have been discussed above. It is especially preferred to have the Rh containing solution further contain a penetration aid. Nickel can be further added in an amount of 0.5 to 20 wt. % NiO and especially in an amount of 1–10% NiO.

When the solutions of cerium salt and lithium salt are applied in the second procedure they can be added either (a) by first a cerium salt followed by a lithium salt, (b) by first a lithium salt followed by cerium salt or (c) by a simultaneous application of a mixture of the cerium salt and the lithium salt.

Having described the basic aspects of the invention, the following examples are given to illustrate specific embodiments thereof.

EXAMPLE 1

Alumina beads produced according to the procedure in U.S. Pat. No. 4,179,408 by M. G. Sanchez and N. R. Laine, hereafter referred to as simply alumina beads, were precalcined for 16 hours in approximately 400° C. air. A 25 kg batch of this alumina bead having 3 wt. % total volatiles were impregnated by spraying with approximately 24.5 liters of mixed nitrate solution containing 766 g of $CeO_2$ in the form of cerous nitrate and 511 g of $Li_2O$ as lithium nitrate. After oven drying the beads at 135° C. for 16 hours, a portion of the beads were air calcined at 1038° C. for one hour. The resulting beads were sifted through 5- and 10-mesh sieves. The beads in the $-5+10$ mesh range had an average diameter of 2.8 mm, 0.477 g/cc bulk density, and 0.900 cc/g water pore volume. This doubly-promoted support was formulated to contain 3 wt. % $CeO_2$, 2 wt. % $Li_2O$, and balance $Al_2O_3$. In order to convert a portion of this support to a Pt-Rh catalyst, sulfito complex solutions of noble metals were prepared according to the procedure described below.

Approximately 150 g of a dilute solution containing 4.40 g of 41.62% ammonium bisulfite was adjusted to a pH of 8.33 using a dilute $NH_4OH$ solution. To this was slowly added 4.9324 g of a chloroplatinic acid solution containing a total of 0.750 g Pt. The solution was then diluted with deionized water to exactly 250 g. The solution turned colorless within one hour upon standing at ambient temperature. This solution bearing 3 g of Pt per kg of solution is hereafter referred to as Solution A.

Approximately 60 g of a dilute sulfurous acid solution in a bottle containing 0.374 g of pure $SO_2$ was contacted with 2.364 g of $RhCl_3$ solution containing 200 mg of Rh. After gentle mixing and dilution with deionized water to a 100 g solution, the bottle was sealed, and then soaked in a 60° C. water bath for 2 hours. The solution was cooled to room temperature before use. This solution containing 2 mg of Rh per g of solution is hereafter referred to as Solution B.

A 300 ml batch of the doubly-promoted support prepared above was sprayed with 116 ml of a first impregnating solution in the form of a fine mist. This first impregnating solution was prepared by diluting 57.58 g of a freshly prepared Solution A with water to approximately 100 ml. The resulting solution had a pH of 2.24. It was then further diluted to 116 ml before impregnation. After drying the beads on a screen for 16 hours, the beads were resprayed with 110 ml of a second impregnating solution. This second solution was prepared by mixing 24.67 g of Solution A with 7.40 g of Solution B, followed by dilution to approximately 95 ml. The resulting solution had a pH of 1.85. After raising the pH to 2.08 using a dilute $NH_4OH$ solution, the solution was further diluted to 110 ml. After impregnating the beads with the second solution they were dried on a screen for 16 hours in a 135° C. oven and then activated for a one hour reduction period in flowing $N_2$ containing 5% $H_2$ at 400° C. The resulting catalyst was formulated to have a metals loading (g metals/liter catalyst) of 0.791 g Pt and 0.0475 g Rh.

EXAMPLE 2

The alumina beads described in Example 1 were precalcined at approximately 400° C. for 16 hours. A 50 kg batch of this alumina beads having 3 wt. % total volatiles were impregnated with approximately 49 liters of lanthanum nitrate solution containing 2.021 kg of $La_2O_3$. After drying the beads for 16 hours at 135° C., the beads were air calcined at 1038° C. A 25 kg portion of the resulting beads were reimpregnated with approximately 23.8 liters of a mixed nitrate solution containing 774 g $CeO_2$ and 516 g of $Li_2O$. After 135° C. drying for 16 hours the beads were air calcined at 1010° C. for one hour. The resulting beads were sifted through 5- and 10-mesh sieves. The beads in the $-5/+10$ mesh range had an average diameter of 2.8 mm, 0.499 g/cc bulk density, and 0.90 cc/g water volume. This doubly-promoted support with lanthana stabilization was formulated to have the following composition (wt. %): 3.8% $La_2O_3$, 3% $CeO_2$, 2% $Li_2O$, and balance $Al_2O_3$.

A 300 ml batch of Pt-Rh catalyst was prepared on the above-prepared support in exactly the same manner as in Example 1, applying the same metals loading of 0.791 g Pt and 0.0475 g Rh using Solutions A and B described in Example 1.

EXAMPLE 3

An 8.5 cc sample each of the two Pt-Rh catalysts prepared in Examples 1 and 2 was pulsator-aged for a period of 202.5 hours, using n-hexane as the fuel. The fuel contained 0.033 g/liter Pb, 0.033 g/liter, Zn, 0.0528 g/liter P, and 0.08 wt. % S. During the period of aging the catalyst samples were allowed to experience cycling temperatures. The cycle consisted of a low temperature of 566° C. (at wall) which was maintained for 75 minutes and then a higher temperature of 732° C. (at wall) which was maintained for 15 minutes. Each sample after 67.5-hour aging was then evaluated by the "cycled TWC test" as described by M. V. Ernest and G. Kim in Soc. of Automot. Eng. Paper No. 800083 at approximately 92,000 GHSV, using the test feed shown in Table 1 and 482° C. inlet gas temperature.

TABLE 1

| | Composition (vol. %) of Test Feed Gas in "Cycled TWC Test" | | |
|---|---|---|---|
| Gaseous Component | Rich Stream | Lean Stream | Cycled[a] Stream |
| $C_3H_6$ | 0.027 | 0.027 | 0.027 |
| $C_3H_8$ | 0.009 | 0.009 | 0.009 |
| CO | 0.72 | 0.29 | 0.376–0.694 |
| $H_2$ | 0.24 | 0.10 | 0.128–0.232 |
| NO | 0.162 | 0.162 | 0.162 |
| $O_2$ | 0.20 | 0.70 | 0.230–0.60 |
| $CO_2$ | 14.5 | 14.5 | 14.5 |
| $H_2O$ | 10 | 10 | 10 |
| $N_2$ | Balance | Balance | Balance |

[a]Cycled between the rich and lean streams at 1 Hertz varying the proportions.

The results of the cycled TWC Test are presented in Table 2 and represent TWC performance under a rich (R=0.7), stoichiometric (R =1.0), and a lean (R=1.5) conditions, where R is a measure of air/fuel ratio defined as the ratio of total oxidant ($O_2$+NO) to total reducing agent (HC, CO, and $H_2$) in the test feed, each entity being expressed in terms of $O_2$ equivalent. The performances of pulsator-aged samples in oxidizing warm-up test are presented in Table 3. This test is also described in the above-cited Soc. of Automot. Eng. paper No. 800083. Also presented in Table 3 are the results obtained when 8.5 cc samples of the two catalysts in Examples 1 and 2 were subjected to 18-hour hydrothermal aging (HTA) at approximately 18,000 GHSV and 982° C. in flowing $N_2$ containing 10% steam, 20 ppm $SO_2$, 400 ppm $C_3H_6$, 0.75% $O_2$, 1.8% CO (½ sec. on, ½ sec. off), oscillating between net reducing (R=0.7) and net oxidizing (R=4.0) conditions at 1 Hertz. The performances in oxidizing warm-up test of the two catalysts in Examples 1 and 2 after pulsator aging and HTA treatment are included in Table 3.

TABLE 2

Performances[a] of Ceria-Lithia-Promoted Pt—Rh Catalysts After Pulsator Aging or Hydrothermal Aging

| Catalyst in Example | Stabilized | Aged[b] | hrs. | Lean (R = 1.5) HC | CO | NO |
|---|---|---|---|---|---|---|
| 1 | No |   | 0 | 95 | 97 | 78 |
|   |   | P | 67.5 | 83 | 93 | 64 |
|   |   | P | 135 | 76 | 90 | 59 |
|   |   | P | 202.5 | 65 | 89 | 49 |
|   |   | HT | 18 | 92 | 97 | 75 |
| 2 | Yes |   | 0 | 95 | 97 | 80 |
|   |   | P | 67.5 | 86 | 96 | 70 |
|   |   | P | 135 | 78 | 93 | 64 |
|   |   | P | 202.5 | 65 | 89 | 50 |
|   |   | HT | 18 | 95 | 99 | 78 |

[a]At approximately 92,000 GHSV by the cycled TWC test.
[b]P: Pulsator-aged at 566–732° C.
HT: Hydrothermally aged at 982° C.

TABLE 3

Oxidizing Warmup Activities of Stabilized Ce—Li TWCs

|  | Catalyst in Example 1 | Catalyst in Example 2 |
|---|---|---|
| Stabilizer | None | 4% $La_2O_3$ |
| ACTIVITY PARAMETER | FRESH | |
| Delta t, sec. | 19 | 20 |
| time-50% CO Conv., sec. | 63 | 60 |
| time-50% HC Conv., sec. | 107 | 137 |
| Propane Conv., % | 76 | 70 |
| CO Conv., % | 99+ | 99+ |
| After 24 Hours at 982° C. in Air | | |
| Delta t, sec. | 67 | 50 |
| time-50% CO Conv., sec | 270 | 213 |
| time-50% HC Conv., sec. | — | — |
| Propane Conv., % | 46 | 50 |
| CO Conv., % | 99+ | 99+ |
| After 18 Hours HTA at 982° C. | | |
| Delta t, sec. | 20 | 19 |
| time-50% CO Conv., sec. | 53 | 48 |
| time-50% HC Conv., sec. | 103 | 96 |
| Propane Conv., % | 72 | 76 |
| CO Conv., % | 99+ | 99+ |
| After Pulsator Aging for 202.5 Hours | | |
| Delta t, sec. | 35 | 38 |
| time-50% CO Conv., sec. | 82 | 78 |
| Propane Conv., % | 39 | 40 |
| CO Conv., % | 94 | 94 |

Delta t = time required to attain 90% conversion from 10% conversion of CO
time-50% = time required to attain 50% conversion
conv. = % conversion attained under a steady-state condition These data clearly show high performance of lanthana-stabilized TWC when doubly promoted with ceria and alkali metal oxides, especially lithia. The data show that the catalytic activity has not been harmed by the addition of La which has provided a gain in hydrothermal stability. The data in Table 3 indicates La stabilized sample is consistently equivalent or better than the catalyst with no La present.

The two catalysts of Examples 1 and 2 were also tested for the extent of alpha-alumina formed, the volume shrinkage, and the change in surface area upon exposure to severely high temperatures or hydrothermal condition. The results are set forth in Table 4.

TABLE 4

Effect of Lanthana Stabilization on the Properties of Doubly Promoted TWCs

|  | Catalyst in Example 1 | Catalyst in Example 2 |
|---|---|---|
| La-Stabilized Alpha-Alumina, %[a] | No | Yes |
| After 18 hours HTA @ 982° C.[b] | 9 | trace |
| After 24 hours in 1066° C. air | 35 | none |
| After 24 hours in 1149° C. air | 47 | trace |
| Volumetric Shrinkage, % | | |
| After 24 hours in 1066° C. air | 25.6 | 10.8 |
| After 24 hours in 1149° C. air | 33.3 | 23.2 |
| Surface Area, $m^2/g$[c] | | |
| After 24 hours in 1066° C. air | 53 | 75 |
| After 24 hours in 1149° C. air | 21 | 29 |

[a]Determined on samples after shrink determination.
[b]Hydrothermally aged (cf. Text of Example 3).
[c]Single-point BET ($N_2$) surface area.

It should be noted that, without stabilization with lanthana, there is a strong tendency to form alpha-alumina, causing a substantial volume shrinkage. The data also show that the alpha-alumina formation is accelerated in the hydrothermal environment. Thus the stabilization of alumina pellets (or particles) with lanthana or La-rich rare earth oxides is a significant improvement in the production of Pt-group metal emission control catalysts, including the doubly promoted TWCs. By using the La stabilization there will be a lower volume shrinkage upon use. This means that in the case of beads in a converter, there will be less of a chance of the beads moving around in the converter and thus less chance of attrition.

EXAMPLE 4

This example serves as a control to show depositing rhodium and platinum together.

Alumina beads were air calcined for one hour at 1038° C. A portion of beads in the 5–10 mesh range were impregnated to incipient wetness with a cerous nitrate solution. After drying overnight at 135° C., the beads were calcined for one hour in 732° C. air. The resulting beads containing 3 wt. % $CeO_2$ were sifted through 5- and 10-mesh sieves. Beads in the 5–10 mesh range had a bulk density of 0.453 g/ml and a water pore volume of 0.973 cc/g. This support is hereafter referred to as Support A.

A 300 ml portion of Support A was impregnated by spraying with 120 ml of solution containing 173 mg of Pt in the form of $(NH_4)_6Pt(SO_3)_4$ salt solution. After drying overnight at 135° C., the beads were resprayed with 112 ml of solution containing 48.9 mg of Pt in the form of $(NH_4)_6Pt(SO_3)_4$ salt solution, 18.5 mg of Rh in the form of Solution B, and 0.3 millimole of dibasic ammonium citrate. The impregnating solution had a pH of 2.30. After drying again overnight at 135° C., the catalyst was activated for a one hour reduction period in the same manner as in Example 1. The resulting catalyst was formulated to have the following metals loading (g metals/liter catalyst): 0.740 g Pt and 0.0617 g Rh.

EXAMPLE 5

A 300 ml batch of Support A from Example 4 was impregnated by spraying with 120 ml of solution containing 18.5 mg of Rh in the form of Solution B and 0.75 millimole of dibasic ammonium citrate. After drying overnight at 135° C., the beads were resprayed with 112 ml of solution containing 221.9 mg of Pt in the form of $(NH_4)_6Pt(SO_3)_4$ salt solution. The impregnating solution had a pH of 4.44. The beads were dried again at 135° C. overnight. Finally, the catalyst was activated by a one hour reduction in the same manner as in Example 1. The resulting catalyst was formulated to have a metals loading identical to that of the catalyst in Example 4.

EXAMPLE 6

A 300 ml batch of Support A from Example 4 was impregnated by spraying with 120 ml of solution containing 221.9 mg of Pt in the form of $(NH_4)_6Pt(SO_3)_4$ salt solution. After drying overnight at 135° C., the beads were resprayed with 112 ml of solution containing 18.5 mg of Rh in the form of Solution B in Example 1 and 0.75 millimole of dibasic ammonium citrate. The impregnating solution had a pH of 2.50. After drying again overnight at 135° C., the catalyst was activated by one hour reduction in the same manner as in Example 1. The metals loading for this catalyst is identical to that of the catalyst in Example 4.

EXAMPLE 7

An 8.5 ml each of the three catalysts prepared in Examples 4, 5, and 6 was subjected to accelerated pulsator aging for a period of 90 hours at approximately 60 pulses/minute, using n-hexane containing 0.132g/liter Pb, 0.040 g/liter P, and 0.08 wt. % S. During the period of aging the catalyst samples were allowed to experience cycling temperatures. The cycle consisted of 75 minutes at 566° C. (at wall) and 15 minutes at 732° C. (at wall). Each catalyst sample was then evaluated by the "Perturbed Sweep Test" procedure described in Ind. Eng. Chem. Prod. Res. Dev., 21, 267 (1982), using the simulated exhaust gas feed shown in Table 5.

TABLE 5

| Simulated Auto Exhaust Gas Mixture for the Perturbed Sweep Test | |
|---|---|
| Gas | Vol. % |
| $HC^a$ | 0.0400 |
| CO | 0.30–0.78 |
| $H_2$ | 0.10–0.26 |
| NO | 0.185 |
| $SO_2$ | 0.0020 |
| $O_2$ | 0.245–0.725 |
| $CO_2$ | 14.5 |
| $H_2O$ | 10.0 |
| $N_2$ | Balance |

$^a$A mixture of $C_3H_6$ and $C_3H_8$ at a molar ratio of $C_3H_6/C_3H_8 = 4/1$.

The results are presented in Table 6.

TABLE 6

| | | Performance$^a$ of 90 hr. Pulsator-Aged TWCs | | | | | | | | |
|---|---|---|---|---|---|---|---|---|---|---|
| Catalyst in Example | Rhodium Applied Alone | Rich (R = 0.7) | | | Stoi. (R = 1.0) | | | Lean (R = 1.5) | | |
| | | HC | CO | NO | HC | CO | NO | HC | CO | NO |
| 4 | No | 72 | 38 | 63 | 74 | 42 | 52 | 75 | 52 | 33 |
| 5 | Yes | 76 | 44 | 66 | 77 | 52 | 57 | 75 | 63 | 38 |
| 6 | Yes | 76 | 46 | 67 | 77 | 54 | 57 | 77 | 66 | 39 |

$^a$At approximately 60,000 GHSV by the "perturbed sweep test".

When following the preferred noble metal impregnation procedure in which Rh is impregnated in the form of an acid sulfito complex solution along with a penetration aid such as dibasic ammonium citrate, independent of other noble metals as illustrated in Examples 5 and 6, the resulting catalyst is shown to be clearly superior to the procedure often employed in catalyst preparation illustrated in Example 4 where the Rh is added along with another noble metal.

EXAMPLE 8

This example illustrates the production of a larger batch of the type shown in Example 5 which has been tested for dynamometer aging.

A ceria-lithia promoted support was prepared using the same procedure as described in Example 1. That resulting support had a total volatile content of 3.35%, a bulk density of 0.4777 g/cc, and a water pore volume of 0.95 cc/g. The $CeO_2$ and $Li_2O$ contents were determined by chemical analysis to be 3.27% and 2.32%, respectively.

A TWC was prepared by impregnating to a platinum loading of 0.712 g per liter of catalyst and a rhodium loading of 0.0712 g per liter of catalyst. This was accomplished by starting with 28162 grams of the above ceria-lithia promoted support which was impregnated by spraying with a solution of rhodium sulfito complex through atomizing nozzles. The rhodium sulfito complex solution was prepared by reacting at 60° C. for 2 hours 89.775 grams of rhodium trichloride solution (having a rhodium concentration of 4.8615%) with 115.84 grams of sulfurous acid (having a $SO_2$ content of 7.39%) diluted with deionized water to a total volume of 4364 milliliters. After the two-hour reaction time, the reaction mixture was cooled to room temperature and then diluted to 23.2 liters at which volume the pH was 2.0. Then 33.25 grams of dibasic ammonium citrate was added, followed by dilution to 24.08 liters at which volume the pH was 2.9. After the rhodium solution was applied the impregnated support was allowed to remain in the impregnation vessel for two hours at room temperature. It was then transferred to a forced draft oven for 16 hours at 135° C.

The above material once removed from the oven and cooled to room temperature was reimpregnated with a platinum-containing solution by spraying through atomizing nozzles. The platinum-containing solution was prepared by diluting 474.17 grams of hexammonium platinum tetrasulfite solution (having a platinum concentration of 9.2045%) to a final volume of 22.74 litters at which volume the pH was 5.9. This was again allowed to remain in the impregnation vessel for two hours at room temperature once impregnation had been completed. After drying for 16 hours at 135° C., the catalyst was activated in a flow of 5% hydrogen/95% nitrogen for one hour at 385°–399° C.

The resulting catalyst had a bulk density of 0.4812 g/cc, a BET surface area of 117 $m^2/g$, and major/minor axes dimensions of 3.07/2.57 millimeters, respectively.

This catalyst has performed superbly after the dynamometer equivalent of 50,000-mile aging, setting the best performance record ever established for a 160-cubic inch single-bed pelleted TWC converter, better than 90% for both HC and CO and better than 45% $NO_x$ conversion efficiencies. This performance represents a substantial improvement over those having similar compositions which were prepared in the same manner as in Example 4.

The uniqueness of the catalyst of this example as well as those prepared by using this new metals impregnation and drying procedure is in the metals concentration profiles which can be characterized as follows. First, a maximum platinum concentration is found within about 50 microns of the exterior surface of the support and no more than about 70% of the total platinum loaded is located within about 100 microns depth. Second, a maximum rhodium concentration is also found within about 50 microns of the exterior surface of the support and no more than about 80% of the total rhodium loaded is located within about 100 microns depth. Finally the average metal penetration depth as determined by the $SnCl_2$ staining method does not exceed approximately 300 microns.

It should be noted that the distribution of catalytic metals in this new type of long-durability pelleted TWCs has been optimized to lower the metals concentrations at or near the exterior surface of the pellet while limiting the metals penetration to a desired depth. Lower metals concentration at or near the exterior surface means lower waste due to poisoning than otherwise. Confining the metals distribution to within the outer shell of desired thickness also reduces waste of metals because the metals located too deep contribute little because of pore diffusion limitation.

EXAMPLE 9

This example illustrates the production of a relatively large size bead catalyst according to the invention.

Alumina beads were precalcined in approximately 450° C. air to 3 wt. % total volatiles. A 53.07 kg batch of this precalcined alumina bead was impregnated with approximately 67.1 kg of solution which was prepared by diluting 9,239 g of a concentrated lanthanum nitrate solution (24 wt. % $La_2O_3$) with water. After drying in 135° C. air the beads were calcined in 1038° C. air for one hour. A 26.76 kg portion of the resulting beads thus stabilized with 4.13 wt. % $La_2O_3$ was impregnated with a solution which was prepared by mixing 3,152 g of a cerous nitrate solution bearing 24 wt. % $CeO_2$ and 2,326 g of lithium nitrate crystals bearing 21.67% $Li_2O$, and diluting to a total weight of 24.53 kg. After drying at approximately 135° C. the beads were air calcined at 1010° C. for one hour. A portion of this support, consisting of 3.92 wt. % $La_2O_3$, 2.70 wt. % $CeO_2$, and 1.80 wt. % $Li_2O$, was sifted through 5- and 8-mesh sieves. The support in the $-5/+8$ mesh range had an average diameter of 3.42 mm, a bulk density of 0.5176 g/cc, a water pore volume of 0.85 cc/g, and a total volatiles of 4.36 wt. %. An 8,508 g portion of the above support in the 5-8 mesh range was doubly impregnated, first with a Rh-containing solution which was prepared by reacting for two hours at 60° C. a mixture of 31.64 g of $H_2SO_3$ solution having a $SO_2$ concentration of 6.29 wt. % with 20.8570 g of $RhCl_3$ solution having a concentration of 4.8615 wt. % Rh in a total olution volume of 500 ml. After the reaction period the solution was cooled to ambient temperature and then was diluted with water to approximately 6,510 ml. At this point 3.72 g of dibasic ammonium citrate was added to the solution. The pH of this impregnating solution was 2.46. It was sprayed on the support using atomizing nozzles. The beads were allowed to stand at ambient temperature for two hours and then were dried at 135° C. for 16 hours.

The dried beads were reimpregnated with approximately 6,150 ml of solution containing 126.7719 g of $(NH_4)_6Pt(SO_3)_4$ salt solution having a concentration of 9.598 wt. % Pt. This impregnating solution had a pH of 6.44. Again the impregnated beads were allowed to stand at ambient temperature for two hours prior to oven drying at 135° C. The dried beads were activated for a one hour reduction period in a flowing stream of 5 vol. % $H_2$ and balance $N_2$ at 385°–400° C. The resulting catalyst has been formulated to a noble metals loading (g metals/liter catalyst) of 0.740 g Pt and 0.617 g Rh.

The metals distribution data show that less than 70% of the total Pt loaded is located within 100 microns and less than 94% of the total Rh loaded is located within 100 micron depth.

This catalyst has performed very well after the dynamometer equivalent of 50,000-mile aging, despite its relatively low geometrical surface area per unit volume of the reactor or converter due to its relatively large bead size. The performance data in a TWC sweep test run on a full size converter after the dynamometer equivalent of 50,000-mile aging are better than 86% for both HC and CO conversions and better than 45% $NO_x$ conversion efficiency. These data substantially exceed the levels of conversion efficiencies usually expected for the catalysts of bead size employed in this example which are no more than 80% for both HC and CO, and no more than 40% for $NO_x$ after the dynamometer equivalent of 50,000-mile aging.

EXAMPLE 10

In this example a catalyst is stabilized with a La-rich rare earth oxide.

Alumina beads were precalcined at 400° C. for 16 hours. The resulting beads had a bulk density of 0.489 g/cc, a water pore volume of 0.98 cc/g, and a total volatiles of 3.70 wt. %. Each of six 1,033 g batches of these beads was treated batchwise by soaking for one minute (allowing all air displacement to cease) in 1,395 ml of solution containing 335.89 g of lanthanum nitrate solution having a solids concentration of 25.52 wt. %. The beads were then separated from the excess solution and allowed to air dry for one-half hour at ambient temperature prior to drying at 135° C. Each batch was finally calcined at 1038° C. for one hour. The blend of all batches had a total rare earth oxide concentration of 5.70 wt. %; 60.5% of which was lanthana, i.e., 3.45 wt. % $La_2O_3$. At this stage the support had a bulk density of 0.5403 g/cc, a water pore volume of 0.88 cc/g, and a total volatiles of 1.14 wt. %. A 5,630 g portion of the above support was impregnated with approximately 4,940 ml of a mixed solution containing 714.53 g of cerous nitrate solution having a concentration of 24.5985 wt. % $CeO_2$ and 536.07 g of lithium nitrate crystals with an assay of 100.8%. After drying at 135° C. for 16 hours the beads were calcined in 1010° C. air. The beads were then sifted through 10-mesh sieves. The support on 10-mesh sieve had a bulk density of 0.5769 g/cc, a water pore volume of 0.72 cc/g, and a total volatiles of 1.50 wt. %.

In the same manner as in Example 9, a Pt-Rh catalyst was prepared on the above support as follows: A 5,850 g portion of the above support was doubly impregnated, first with an acid sulfito complex solution of Rh prepared by reacting for two hours at 60° C. a mixture of 19.29 g of $H_2SO_3$ solution having a $SO_2$ concentration of 7.62 wt. % with 15.4403 g of $RhCl_3$ solution having a Rh concentration of 4.8615 wt. % in a total solution volume of 375 ml. After the reaction period the solution was cooled to ambient temperature, and then diluted with water to approximately 3,820 ml. To this was added 2.294 g of dibasic ammonium citrate. The pH of the impregnating solution was 2.45. The Rh-containing solution was sprayed on the support using atomizing nozzles. The beads were allowed to stand at ambient temperature for two hours prior to drying at 135° C. for 16 hours. The beads were reimpregnated wih 3,605 ml of solution containing 7.5063 g of Pt in the form of $(NH_4)_6Pt(SO_3)_4$. This impregnating solution had a pH of 5.89. Again the impregnated beads were allowed to stand for two hours at ambient temperature prior to oven drying at 135° C. The dried beads were activated by one hour reduction in the same manner as in Example 1. The resulting catalyst has been formulated to a noble metals loading (g metals/liter catalyst) of 0.740 g Pt and 0.074 g Rh.

This catalyst performed satisfactorily in an auto exhaust test.

EXAMPLE 11

This example illustrates the successful use of smaller size beads having an average diameter of 2.8 mm and having a higher Rh content which is 5:1 on a Pt:Rh weight basis. Because of higher Rh content, the Rh was incorporated in two steps with at least one step being a separate impregnation.

Alumina beads were precalcined, stabilized with lanthana, and then doubly promoted with ceria and lithia in exactly the same manner as in Example 8. The resulting beads had a composition (wt. %) of 3.69% $La_2O_3$, 3% $CeO_2$, 2% $Li_2O$, and balance $Al_2O_3$. This support in the 5–10 mesh range had a bulk density of 0.482 g/cc, a water pore volume of 0.95 cc/g, and a total volatiles of 3.49 wt. %.

A 7,923 g portion of the above support having an average diameter of 2.96 mm was doubly impregnated, first with a solution containing exactly half of the total Rh to be loaded. The impregnating solution was prepared by reacting for two hours at 60° C. a mixture of 43.78 g of $H_2SO_3$ solution having a $SO_2$ concentration of 7.57 wt. % with 34.7624 g of $RhCl_3$ solution having a concentration of 4.8615 wt. % Rh in a total solution volume of 600 ml. After the reaction period the solution was cooled to ambient temperature, and then was diluted with water to approximately 7,150 ml. To this was added 11.154 g of dibasic ammonium citrate. The pH of this impregnating solution was 2.79. This Rh-containing solution was sprayed on the support using atomizing nozzles. After drying at 135° C. for 16 hours the beads were reimpregnated with approximately 6,775 ml of solution containing 16.900 g of Pt in the form of $(NH_4)_6Pt(SO_3)_4$ and 1.690 g of Rh in the form of solution which was prepared in exactly the same manner as in the first impregnation. Included also in this mixed solution bearing both Pt and Rh was 3.718 g of dibasic ammonium citrate. The impregnating solution had a pH of 3.35. After drying at 135° C. the catalyst was activated by one hour reduction in the same manner as in Example 9. The resulting catalyst has been formulated to a noble metals loading (g metals/liter catalyst) of 1.028 g Pt and 0.206 g Rh. This catalyst has performed very well in both 160 as well as 100 cubic inch single-bed converters.

The following Examples 12 and 13 are control catalysts for the nickel containing catalyst of Example 13. The comparison test results are given in Example 14.

EXAMPLE 12

This example will serve as a control to show the improvement in HC conversion when nickel is added.

Alumina beads were air calcined at 1038° C. for one hour. Based on 3 wt. % and 6 wt. % $CeO_2$ formulation, two separate batches of the above calcined alumina beads were impregnated to incipient wetness with cerous nitrate solutions, dried at 135° C. overnight, and air calcined at 760° C. for one hour. The resulting batches of beads, one with 3 wt. % $CeO_2$, the other with 6 wt. % $CeO_2$, were sifted through 5- and 10-mesh sieves. One with 3 wt. % $CeO_2$ had a bulk density of 0.447 g/cc, and a water pore volume of 0.920 cc/g. The other with 6 wt. % $CeO_2$ had a bulk density of 0.448 g/cc and a water pore volume of 0.912.

Solutions A and B of Example 1, 300 g and 100 g, respectively, were freshly prepared. A fresh Solution C was prepared by contacting approximately 70 g of dilute sulfurous acid containing 1.00 g of $SO_2$ with 4.630 g of Pd-nitrate solution bearing a total of 363 mg Pd. The solution was diluted to 121 g. The resulting acid sulfito complex solution contains 3 g of Pd per kg of solution. This is hereafter referred to as Solution C.

A 300 ml batch of alumina beads promoted with 6 wt. % $CeO_2$ prepared above was sprayed with 120 ml of solution containing 71.2 mg of Pd in the form of Solution C and 0.75 millimole of dibasic ammonium citrate. After drying at 135° C. overnight the beads were reimpregnated by spraying with 113 ml of solution containing 178 mg of Pt in the form of a freshly prepared Solution A and 10.9 mg of Rh in the form of a freshly prepared Solution B. The impregnating solution had a pH of 2.9. After drying again overnight at 135° C. the beads were activated for a one hour reduction period in the same manner as in Example 1. Metals loading (g metals/liter catalyst) of this catalyst was as follows: 0.593 g Pt, 0.237 g Pd, and 0.0356 g Rh. This catalyst also contained 6 wt. % $CeO_2$.

EXAMPLE 13

This example will serve as a control to show the improvement in HC conversion when nickel is added.

A 300 ml batch of alumina beads promoted with 6 wt. % $CeO_2$ prepared in Example 12 was sprayed with 120 ml of solution which was prepared as follows: 6.72 g of $LiNO_3$ crystals (99.8% assay) was dissolved in approximately 60 g of water. To this was added 0.75 millimole of dibasic ammonium citrate and dissolved. Then to this was added 71.2 mg of Pd in the form Solution C. The solution was finally diluted with water to 120 ml. After drying at 135° C. overnight the beads were resprayed with a Pt-Rh-containing solution, dried at 135° C., and activated in exactly the same manner as in Example 12. The catalyst also contains 5.94 wt. % $CeO_2$ and 1 wt. % $Li_2O$.

EXAMPLE 14

This example has an additional nickel component added for increased HC conversion.

A 300 ml batch of alumina beads promoted with 3 wt. % $CeO_2$ prepared in Example 12 was sprayed with 119 ml of solution which was prepared as follows: 8.42 g of $Ni(NO_3)_2 \cdot 6H_2O$ crystals and 10.04 g of $LiNO_3$ crystals were dissolved in a minimal amount of water, and then diluted to approximately 70 g. To this was added 0.75 millimole of dibasic ammonium citrate and 71.2 mg of Pd in the form of Solution C. The solution was finally diluted with water to 119 ml. After drying the beads overnight at 135° C., the second impregnation with a solution containing both Pt and Rh, drying at 135° C., and the final catalyst activation were carried out in exactly the same manner as in Example 12. The metals loading of this catalyst is identical to that of the catalyst in Example 12. This catalyst also contains 1.5 wt. % $Li_2O$, 1.5 wt. % NiO, and 2.91 wt. % $CeO_2$.

EXAMPLE 15

An 8.5 cc sample each of the three Pt-Pd-Rh catalysts in Examples 12, 13 and 14 were pulsator-aged for 90 hours in essentially the same manner as in Example 7. The poison levels in the fuel (n-hexane) for this series of aging runs were 0.0528 g/liter Pb, 0.100 g/liter P, and 0.08 wt. % S. The temperature during the aging run was allowed to cycle between 566° C. for 70 minutes and 760° C. for 20 minutes. The aged catalysts were evaluated in the same manner as in Example 7. The performance data are presented in Table 7.

TABLE 7

| Catalyst in Example | Promotors (Wt. %) | Performance[a] of Pt—Pd—Rh TWCs After 90 hr. Pulsator Aging | | | | | | | | |
|---|---|---|---|---|---|---|---|---|---|---|
| | | Rich (R = 0.7) | | | Stoi. (R = 1.0) | | | Lean (R = 1.5) | | |
| | | HC | CO | NO | HC | CO | NO | HC | CO | NO |
| 12 | 6% $CeO_2$ | 67 | 50 | 67 | 67 | 61 | 52 | 66 | 67 | 28 |
| 13 | 6% $CeO_2$ 1% $Li_2O$ | 70 | 48 | 67 | 71 | 63 | 59 | 69 | 73 | 31 |
| 14 | 3% $CeO_2$ 1.5% $Li_2O$ 1.5% NiO | 73 | 47 | 64 | 74 | 60 | 53 | 74 | 72 | 31 |

[a]At approximately 60,000 GHSV by the "perturbed sweep test".

The data in Table 7 illustrate the presence of a relatively low level of Ni is beneficial especially for HC performance since the values for the catalyst of Example 14 is superior to that of the catalyst in Example 12 having about the same 6% level of base metal additive. This Ni may exist on the catalyst in the form of Ni and NiO. Thus for a catalyst requiring improved HC performance, Example 14 illustrates an optional embodiment which achieves this result.

It is understood that the foregoing detailed description is given merely by way of illustration and that many variations may be made therein without departing from the spirit of this invention.

What is claimed is:

1. A catalyst suitable for use as a catalyst for auto emission control comprising an alumina support with components deposited thereon consisting essentially of lanthana as a stabilizer in an amount of about 1 to 10% by weight expressed as $La_2O_3$ which is either in the form of lanthana only or in the form of lanthana-rich rare earth oxides where the $La_2O_3$ is at least 50% by weight of the total rare earth oxides, 1-20% by weight of ceria as a promoter, at least 0.5 to about 5% by weight of an alkali metal oxide as a promoter, and a catalytically-effective amount of one or more platinum group metals.

2. A catalyst according to claim 1, wherein the alumina support is pelleted and said platinum group metals penetrate the alumina support to an average distance less than approximately 300 microns as measured by the $SnCl_2$ solution staining method.

3. A catalyst according to claim 1, wherein the alkali metal oxide is $Li_2O$.

4. A catalyst according to claim 1, wherein the lanthana expressed as $La_2O_3$ is about 2-6% by weight.

5. A catalyst according to claim 1, wherein the ceria is present from about 2 to 10% wt. % $CeO_2$ and the alkali metal oxide is present from 1 to 3 wt. % alkali metal oxide.

6. A catalyst according to claim 2, wherein the platinum group metals comprise at least platinum and rhodium.

7. A catalyst according to claim 1, wherein the alumina support is a washcoat powder.

8. A catalyst according to claim 6, wherein a maximum platinum concentration is within about 50 microns of the exterior surface of the support and no more than about 70% of the total platinum loaded is located within about 100 microns depth and a maximum phodium concentration is within about 50 microns of the exterior surface of the support and no more than about 95% of the total rhodium loaded is located within about 100 microns depth.

9. A method of making a catalyst which is suitable for use as a three-way catalyst for auto emission comprising the steps of (a) impregnating an alumina support which has been heated to at least 300° C. with a solution containing a lanthanum salt which is either in the form of lanthanum salt only or in the form of lanthanum-rich rare earth salts, which upon calcination gives rare earth oxides where $La_2O_3$ is at least 50% by weight of the total rare earth oxides;

(b) heating the impregnated support to at least decompose the lanthanum salt to obtain a lanthana impregnated support;

(c) applying promoters and one or more platinum group metals by either

A.
  (1) impregnating the lanthana-impregnated alumina support from step (b) with a soluble cerium salt solution;
  (2) heating the impregnated support to at least decompose the cerium salt to obtain a lanthana-ceria impregnated support; and
  (3) impregnating the lanthana-ceria impregnated support with solutions bearing one or more platinum group metals and at least one alkali metal; or B.
  (1) impregnating the lanthana impregnated support from step (b) with a solution containing a soluble cerium salt and a lithium salt;
  (2) heating the impregnated support to at least decompose the cerium and lithium salts to obtain a lanthana-ceria-lithia impregnated support; and
  (3) impregnating the lanthana-ceria-lithia impregnated support with solutions bearing one or more platinum group metals to form a catalyst;

(d) air drying the catalyst at ambient temperature for 0–4 hours, and at about 100°–150° C. to dry the catalyst after each impregnation with solutions bearing catalytic metals; and (e) activating the catalyst, which has previously been heated to a temperature of at least 800°–1100° C. in one of the prior steps (b) or (c), at a temperature of about 250°–550° C.

10. A method according to claim 9, wherein the heating in step (b) is done at a temperature of from about 800° to 1100° C. to thermally stabilize the support.

11. A method according to claim 9, wherein the activation in step (e) is done in the presence of hydrogen.

12. A method according to claim 9, wherein the platinum group metals in step (cA3) or (cB3) are provided in the form of water soluble platinum group metal compounds which are selected from the group consisting of sulfito complexes of platinum group metals, chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

13. A method according to claim 12, wherein the platinum group metals in step (cA3) or (cB3) are provided in the form of sulfito complexes.

14. A method according to claim 9, wherein the platinum group metals in step (cA3) or (cB3) include Rh and wherein at least a part of the Rh containing solution is impregnated separately from the other platinum group metal solutions.

15. A method according to claim 14, wherein the Rh containing solution further contains a penetration aid.

16. A method according to claim 9, wherein the alkali metal in step (cA3) is lithium.

17. A method according to claim 9, wherein nickel is further added in an amount of 0.5 to 20 wt. % NiO.

18. A method according to claim 17, wherein the nickel, is added in an amount of 1–10% NiO.

19. A method according to claim 9, wherein the solutions of cerium salt and lithium salt are applied in step (cB1) either (a) by first a cerium salt followed by a lithium salt, (b) by first a lithium salt followed by cerium salt or (c) by a simultaneous application of a mixture of the cerium salt and the lithium salt.

20. A catalyst made by the process of claim 9.

21. A catalyst made by the process of claim 13.

22. A catalyst according to claim 1, wherein the lanthana is initially deposited on the alumina support and thereafter the ceria, alkali metal oxide and one or more platinum group metals are deposited thereon.

* * * * *